United States Patent
Fernandes et al.

(10) Patent No.: US 10,632,822 B2
(45) Date of Patent: Apr. 28, 2020

(54) AUTOMOTIVE PROTECTIVE PLATE FOR SOLAR RAYS

(71) Applicant: Elaine Fernandes, Virginia Beach, VA (US)

(72) Inventors: Elaine Fernandes, Virginia Beach, VA (US); Aurelio Lisboa, Virginia Beach, VA (US)

(73) Assignee: Elaine Fernandes

( * ) Notice: Subject to any disclaimer, the term of this patent is extended or adjusted under 35 U.S.C. 154(b) by 36 days.

(21) Appl. No.: 16/543,234

(22) Filed: Aug. 16, 2019

(65) Prior Publication Data
US 2019/0389283 A1 Dec. 26, 2019

(30) Foreign Application Priority Data

Apr. 2, 2019 (BR) ..................... 10 2019 006673-3
May 22, 2019 (CL) .................................. 201901384

(51) Int. Cl.
*B60J 3/00* (2006.01)
*B60J 3/02* (2006.01)
*G02B 5/20* (2006.01)

(52) U.S. Cl.
CPC ............. *B60J 3/0286* (2013.01); *G02B 5/208* (2013.01)

(58) Field of Classification Search
CPC ............................. B60J 30/0286; G02B 5/208
See application file for complete search history.

(56) References Cited

U.S. PATENT DOCUMENTS

| | | | |
|---|---|---|---|
| 4,749,222 A * | 6/1988 | Idland | B60J 3/0286 160/370.21 |
| 5,002,326 A | 3/1991 | Westfield | |
| 6,037,280 A * | 3/2000 | Edwards | D06M 11/44 139/383 R |
| 7,571,560 B2 * | 8/2009 | Peterman | G09F 1/10 24/336 |
| 8,083,385 B1 * | 12/2011 | Yang | G02F 1/13318 349/13 |
| 9,469,246 B1 * | 10/2016 | Gold | B60J 5/04 |
| 2006/0231220 A1 * | 10/2006 | Huang | B60J 1/2011 160/370.21 |
| 2010/0072773 A1 * | 3/2010 | Leal | B60J 1/2091 296/97.7 |
| 2011/0042995 A1 * | 2/2011 | Benites | B60J 1/20 296/97.11 |

(Continued)

FOREIGN PATENT DOCUMENTS

CH        671373 A5    8/1989

OTHER PUBLICATIONS

TuckVisor—Removable and Reusable Side Sun Visor. Retrieved from https://tuckvisor.com/, Web Video Oct. 20, 2017.

(Continued)

*Primary Examiner* — Lori L Lyjak
(74) *Attorney, Agent, or Firm* — Mariana Vernieri (57) ABSTRACT

An automotive solar protection plate, which is located hung on the side window of a car, through the use of fins or tongues that are an integral part of the plate and made from the same material, being plate and fins only one piece. The plate is adapted to be placed both on slightly curved windows or on straight windows of vehicles of different types (cars, trucks, off-road vehicles and others).

17 Claims, 5 Drawing Sheets

(56) References Cited

U.S. PATENT DOCUMENTS

| | | | |
|---|---|---|---|
| 2012/0052244 A1* | 3/2012 | Schoenberger | C23C 14/086 428/141 |
| 2012/0256442 A1* | 10/2012 | Rajsuman | B60J 3/0208 296/97.8 |
| 2012/0309249 A1* | 12/2012 | Von Bokern | D04H 1/54 442/329 |
| 2013/0050983 A1* | 2/2013 | Labrot | B32B 17/10036 362/84 |
| 2013/0278989 A1* | 10/2013 | Lam | B60J 3/04 359/275 |
| 2017/0120732 A1* | 5/2017 | Roh | B60J 1/2011 |
| 2017/0165884 A1* | 6/2017 | Benyahia | B32B 7/05 |

OTHER PUBLICATIONS (Apr. 18, 2018). Sun visor. Retrieved from https://www.carwash.com/sun-visor/, Web Article.

* cited by examiner

AUTOMOTIVE PROTECTIVE PLATE FOR SOLAR RAYS

CROSS-REFERENCE TO RELATED APPLICATIONS

Pursuant to 35 U.S.C. § 119 and the Paris Convention Treaty, this application claims the benefit of Brazilian Patent Application No. 10 2019 006673-3 filed Apr. 2, 2019, and of Chilean Patent Application No. 201901384 filed May 22, 2019, the entire contents of both of which are explicitly incorporated herein by reference.

TECHNICAL FIELD

This invention relates generally to the field of vehicle accessories. More particularly, this invention relates to a solar protective plate for vehicle windows.

BACKGROUND OF THE INVENTION

The unwanted entrance of solar rays through the windows of vehicles is a well-known and generalized problem that affects the safety and comfort of drivers and passengers alike. For starters, there is the high risk of the rays obscuring the vision of the driver and causing accidents. Secondly, the vision of other passengers may also be disturbed by these rays. Both driver and passenger may additionally suffer from lesions on the skin due to excessive UV exposure, affecting the face and other exposed areas of the body when inside of the vehicle. Lastly—but not less importantly—another unwanted consequence of the largely unrestricted penetration of solar rays through the vehicle's windshield and glass windows relates to the increase of heat inside of the cabin of the vehicle. In periods of high temperatures the amount of energy that enters a car and bounces-in overheating its interior can even become deadly, as an increasing number of cases of pets and children found dead after being left for a few minutes inside of hot cars has sadly demonstrated. Without going to such extremes, the heat at the interior of the vehicle due to its exposure to solar rays penetrating its transparent surfaces while parked, is an every-day nuisance for people in hot climates which conspires against the comfort of driving or riding cars, vans, trucks, and other vehicles.

So bothersome is this problem that a large number of devices for solar and UV rays protection has been developed through the years for placing outside or inside the vehicle to mitigate the aforementioned negative effects, none of which proved to be entirely satisfactory for various reasons. These attempted solutions range from the application of darkening films directly to automotive glass surfaces to the provision of screens with suction pressure cups, strips or elastics.

In the case of coating the windows with film, such an alternative proves to be costly and sometimes unfeasible and/or inaccessible to many vehicle owners. In addition, compliance with traffic regulations impose some limitations on their application, which should be done preferably by a qualified professional, further increasing the costs involved.

Regarding the use of a screen with suction cups, such a device seems to be devoid of any practicality, needing to be properly mounted and installed on the inner surface of automotive windows, and also with the risk of falling by gradually losing the vacuum created in the pressure and suction disc that keeps it fixed to the glass. It is therefore complex and difficult to handle, occasionally requiring the use of excessive force to remove it, and it is not recommended to place it on the side window of the driver's door, as it may disturb and even cause accidents.

Similar is the case of screens using strips, ropes or elastics as means for attaching them. They are difficult to install and uninstall and do not allow safe driving of the vehicle and storing inside the vehicle.

Given just a few of the problems listed above and the purpose of overcoming them, as well as providing the market with a much more practical, simple, highly effective, easy-to-transport and low-cost solution when compared to other existing alternatives, the now revealed automotive protective plate was idealized, designed and developed.

SUMMARY OF THE INVENTION

Disclosed is an automotive protective plate for solar rays, intended to provide greater physical and visual safety and comfort to the occupants of a vehicle in a much more practical, simple, effective, easy-to-transport and low-cost fashion than other existing alternatives now available to the public. In order to achieve this, this accessory is adapted to the shape of automotive side windows, being easily and quickly placed and removed from them without the need of any device aimed to adhere it to the car window (such as rubber suction cups), thanks to the provision of fins that fit perfectly in the top profile of the windows, remaining securely fixed between the gap of the chassis and the glass, and protecting the occupants of the vehicle from solar rays without obstructing or impeding external vision.

The surfaces of the plates are capable of reducing the penetration and incidence of solar rays to the inside of the vehicle thanks to their composition based on a polymer (for example PET) with the addition of an adequate light and UV light barriers capable of blocking at least 75% of the UV light transmission and at least 25% of the light in the visible spectrum wavelengths.

Based on the above, it is absolutely clear that the automotive protective plate presented here incorporates innovation of great utility, having completely different characteristics from those pertinent to the state of the art. Its development brings better solutions in their use, performing the functions in a practical and efficient way, and providing a series of advantages inherent to its applicability, having its own characteristics, innovative and endowed with fundamental requirement of novelty, deserving the protection hereby required.

DETAILED DESCRIPTION AND BEST MODE OF IMPLEMENTATION

Disclosed is an automotive protective plate for solar rays, having one or more fins or tongues designed to securely place it inside a car or vehicle window for reducing the penetration and incidence of solar rays to the inside of the vehicle.

More precisely, the aforementioned automotive protective plate was devised, projected and developed with the purpose of mitigating the effects of the incidence of the solar rays that pass through the glass and that end up obfuscating the vision of its passengers, also directly reaching the face and other body parts exposed to these, in addition to leaving the interior of the vehicle with a higher temperature, especially in periods with high temperatures and, consequently, of intense and uncomfortable heat.

This is attained in an affordable and practical manner thanks to its unique design that allows it to be manufactured in just one piece, and to securely attach it to the vehicle's window, without need of any additional device aimed to adhere it to the window (such as rubber suction cups, ropes or elastics). The plates may come in different models whose entire design including their fins, is adapted to different shapes and sizes of vehicle windows, in such a way that they can be easily and quickly attached and removed from it, and stay in place allowing to open and close the door, and to lower and raise the windows of the vehicle to some degree many times without need to remove or pull the plate, as it is shielded and adjusted at the top-side-of-the-window through the pressure exerted by the fins or tongues. Therefore, it is not necessary to pulling and place the solar protective plate on the vehicle's glass each time. To achieve this, it is particularly important that the top side of the plate follows the shape of the top side of the window in which it is to be applied, and that the width of the fins is adequate to the thickness of the window's glass.

The plates can be designed for specific makes and models of cars and other vehicles (trucks, vans, off-road vehicles and others), or they can come in a number of generic shapes and designs able to fit well in many different vehicle windows having approximately similar size and curvature.

The material to be used in for these plates is a polymer (ideally a thermoplastic) having a thickness of no more than 2 mm. In the preferred embodiment, that polymer is PET and that thickness is 0.8 mm. Moreover, to maximize the UV protection the polymer should be treated with an UV blocker. In the case of the PET plaques, they may use a commercially available UV blocker for PET. Different materials and additives may also be used as long as they are able to acquire the required shape and thickness and to effectively absorb the UV and light rays as described below:

UV absorbers to be used in accordance with the present invention must have at least three important properties. First, they must efficiently absorb at least 75% of the UV light transmission and at least 25% of the light in the visible spectrum wavelengths. Second, they must dissipate the energy they absorb in a safe way. Third, they must remain active in for the product's life, that is, they must resist radiation from the sun without losing its properties. The majority of commercially available UV blockers are based on one of the following five chromotrans: benzophenones, benzotriazoles, triazines, oxanilides and cyanoacrylates. In the preferred embodiment, Polyone's ColorMatrix™ LACTRA™ SX LIGHT BLOCKING ADDITIVE for PET (a Blocking Additive in solid masterbatch fom1 typically used for light blocking and protection of PET bottles of liquid dairy contents) is used.

This protective plate for automobiles, belonging to the industrial sector of vehicle accessories, is intended to offer greater physical and visual comfort to the occupants of this means of transport, in a less expensive way.

Some general aspects of the present invention have been summarized so far in the first part of this this detailed description and in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not Instead, the intended function of this disclosure is to exemplify some of the ways —including the presently preferred ways— in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Figure 1:
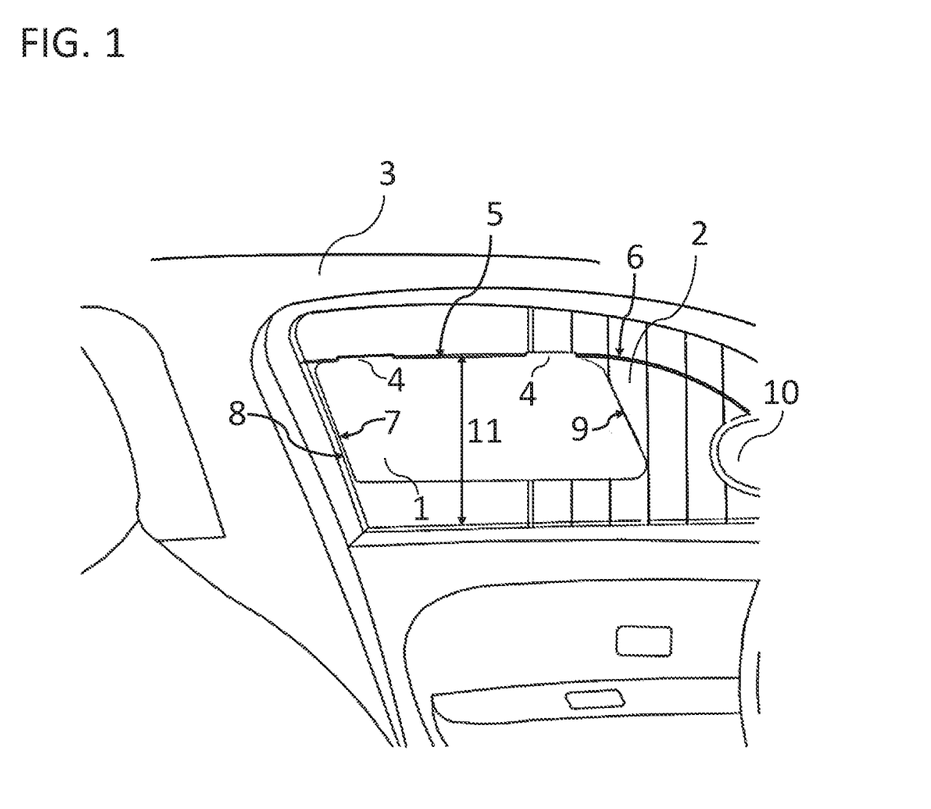
FIG. 1 is a perspective view of an embodiment of an automotive protective plate in accordance with the present invention, placed in the interior of the side window of the driver's seat in a vehicle with curved-top side windows.

Referring to the drawings in more detail, FIG. 1 depicts an automotive protection plate 1 ("plate") which is located hung on the driver's side window 2 of a vehicle 3 (in this case, a car), by means of fins or tongues 4. Said plate is adapted to the shape of the window, in such a way that the top-side-of-the-plate 5 is generally colinear to the top-side-of-the-window 6, the left-side-of-the-plate 7 is generally colinear to the left-side-of-the-window 8, and there is enough space to the right of the right-side-of-the-plate 9 as to allow the driver to see the mirror 10 without obstruction for any given height 11 to which the window may be open.

Figure 2:
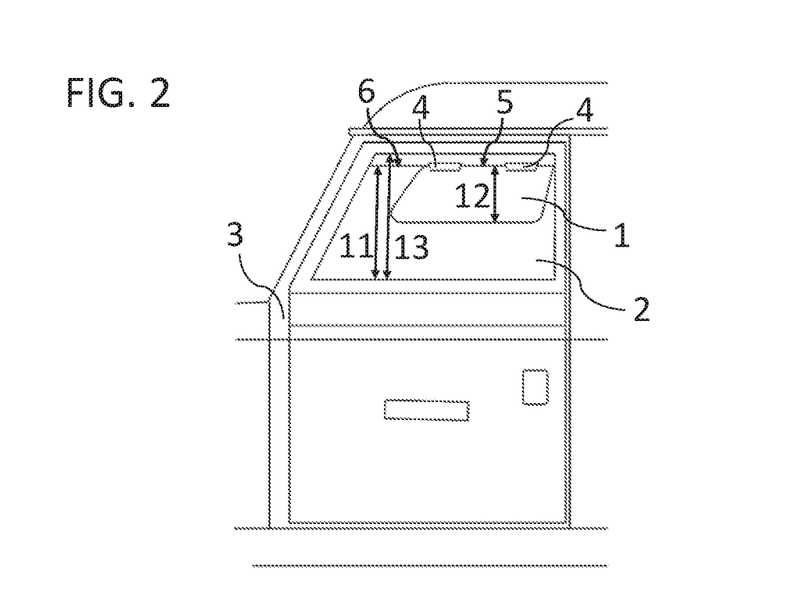
FIG. 2 is a side elevation view of an embodiment of an automotive protective plate in accordance with the present invention, placed in the interior of the side window of the rear seats in a vehicle with straight-top side windows.

In FIG. 2, an automotive protection plate 1 is hung in a vehicle's window 2, whose top-side-of-the-window 6 has the shape of a straight line. Consequently, in the shown embodiment, the top-side-of-the-plate 5 is also straight. The plate has two fins or tongues 4, which protrude a few millimeters from the top-side-of-the-window 6 and have a thickness, shape and width such that said windows 2 close perfectly, even with the plates attached to them. The plate 1, therefore, is perfectly shielded and secured inside the sliding slot of said window 2 which allows the window 2 of the vehicle 3 to be lowered and raised, (thus varying its height 11) without the plate 1 being detached from the window 2 or falling, as it is perfectly adhered to it by the fins 4. The height-of-the-plate 12 is shorter than the max-height-of-the-window 13, (in this example it's less than its half in length) so that the range of movement of the window is larger and the visibility from that window is not substantially obstructed. Some embodiments—in which the material is basically transparent or in which its intended use is only while the vehicle is parked and not while driving-designs may cover a larger surface area of the window for a better UV coverage. However, the height-of-the-plate 12 must still be shorter than the max-height-of-the-window 13 to allow at least some mobility in it so that it can be easily removed from the window when needed.

Figure 3:
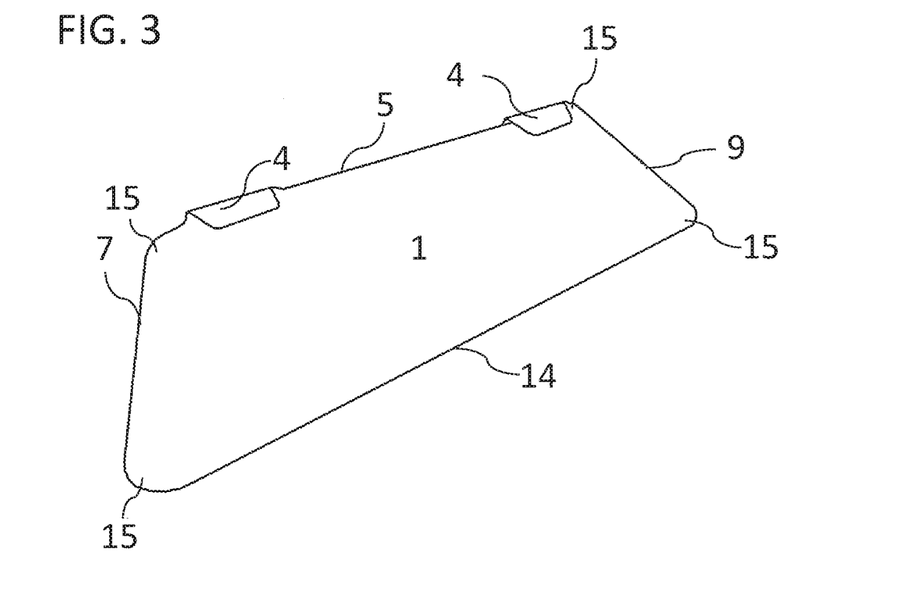
FIG. 3 is a perspective view of an embodiment of an automotive protective plate in accordance with the present invention, having two fixing fins.

FIG. 3 shows the different sections of the automotive protection plate 1. In this example, the plate 1 has two fins 4. The shape of the plate is basically a quadrilateral having a left-side-of-the-plate 7, a right-side-of-the-plate 9, a top-side-of-the-plate 5 (to which the fins 4 pertain), a bottom-side-of-the-plate 14 and four corners 15. Other embodiments use different shapes including polygonal and curved shapes. All of the sides-of-the-plate (5, 7, 9, and 14) may adopt either straight or curve shapes, depending on the design of the window in which it is intended to be used. Similarly, the corners 15 may be curve corners or straight corners, and each may have different levels of curvature.

Figure 4A:
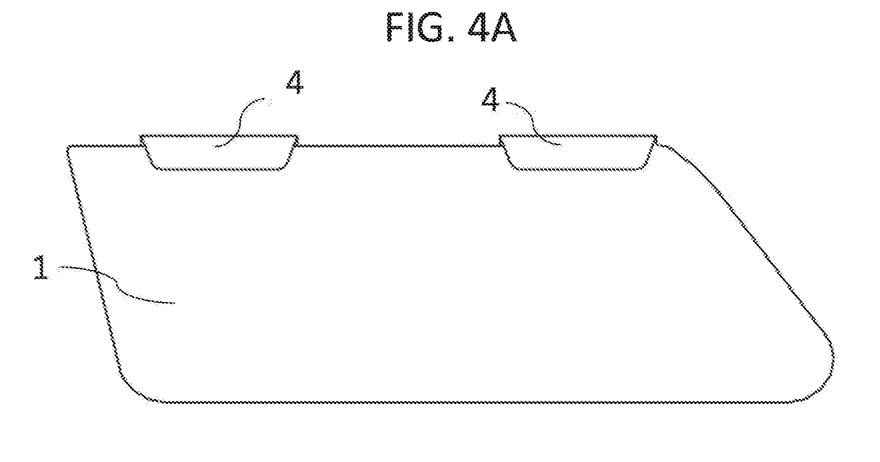
FIG. 4A is a front elevation view of an embodiment of an automotive protective plate in accordance with the present invention
Figure 4B:
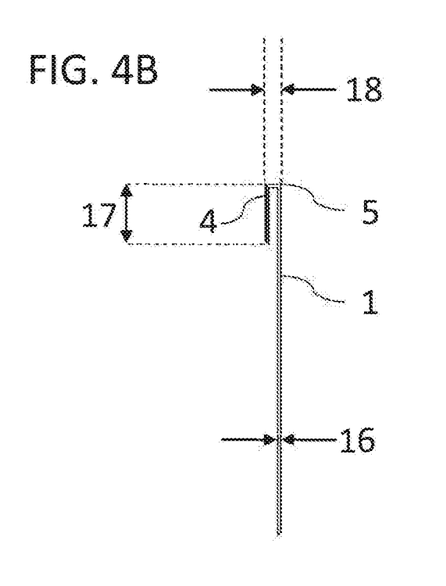
FIG. 4B is a side sectional view of an embodiment of an automotive protective plate in accordance with the present invention

As can be seen in FIGS. 4A and 4B, the plate 1 having two fins 4 is shown both from the front (FIG. 4A) and from the side (FIG. 4B). In this lateral view, it can be appreciated that the plate 1 (including the fins 4) has a constant thickness 16, which in the preferred embodiment is of 0.8 mm. In the top-side-of-the-plate 5, in the locations where the fins 4 are located, a rotation at an angle of 180° is performed to return downwards to a certain distance of shorter length (the length-of-the-fin 17), defining a width 18, in which the thickness of the glass window should tightly fit. These characteristics together with the high rigidity of the material, allows that when installed and at the time of raising the window 2, said plate 1, remains perfectly attached in place.

FIGS. 5A to 5E show different layouts that would fit in some of the most common models of vehicle windows. These layouts are not limiting and are meant just as an example of suitable variations. Other embodiments have different layouts designed for their better adaptation to some models, shapes, widths and sizes of vehicle windows. A person of ordinary skill in the art will easily be able to see what adaptations can be made to the model to be more apt for their intended utility in accordance with the appended claims without departing from the spirit and scope of the invention.

Figure 5A:
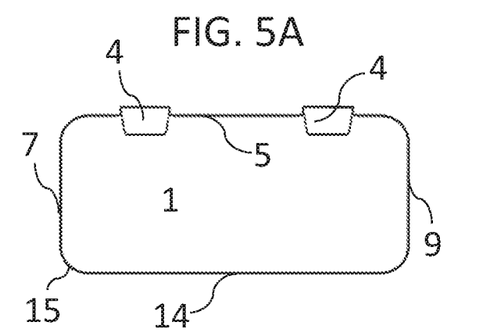
FIGS. 5A to 5E are front elevation views of different possible embodiments of automotive protective plates in accordance with the present invention.
Figure 5B:
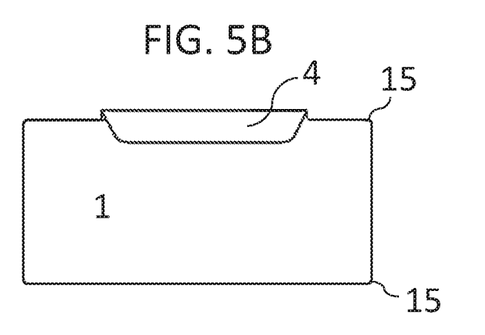
Figure 5C:
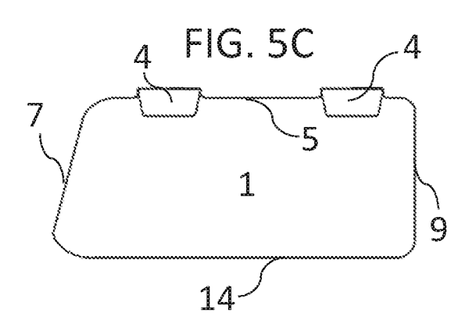
Figure 5D:
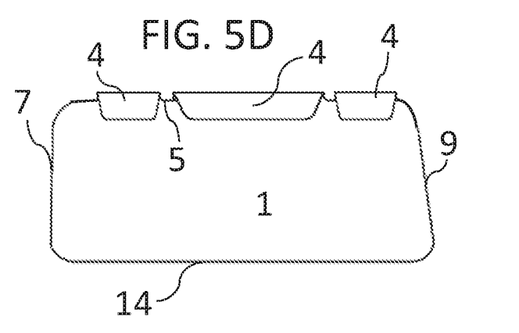
Figure 5E:
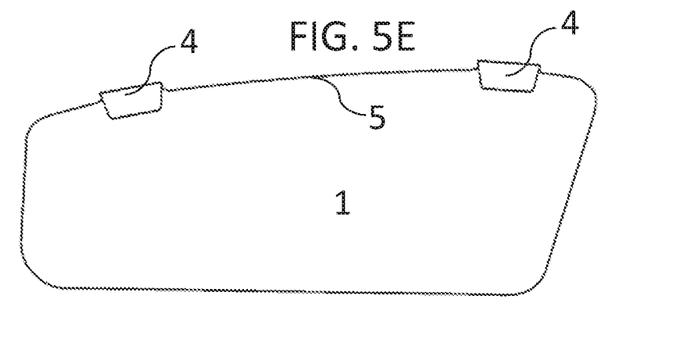

In FIG. 5A, the plate 1 is basically shaped as a rectangle of sides 5, 7, 9 and 14, in which the four corners 15 are rounded corners. This example has two fins 4. Example 5B, on the other hand, is also a rectangle but with straight corners 15 and only one fin, larger and centered. In contrast, the plates 1 shown in FIGS. 5C and 5D are not rectangular. Rather, they keep the parallelism between the top-side-of-the-plate 5 and the bottom-side-of-the-plate 14 but the lateral sides-of-the plate (left 7 and/or right 9) have different angles providing for their better adaptation to some vehicle windows. While the plate 1 in FIG. 5C is shown with two fins 4, the one in FIG. 5D has three fins 4, as an example that even if preferred, the number two with respect to fins is not a requirement for the invention to perform its intended utility. Lastly, FIG. 5E illustrates a design of the plate 1, adapted for its use in vehicle windows with curved top-side-of-the-window 6 (FIG. 1). With this purpose, the top-side-of-the-plate 5 is curved following the typical curvature of many models of windows. Other embodiments follow different curves and/or straight lines and angles and may have different proportions as a function of the manufacturer's decision of whether prioritizing the amount of light and UV rays that is sought to be blocked or the unobstructed lateral visibility to be kept.

Figures 6, 7:
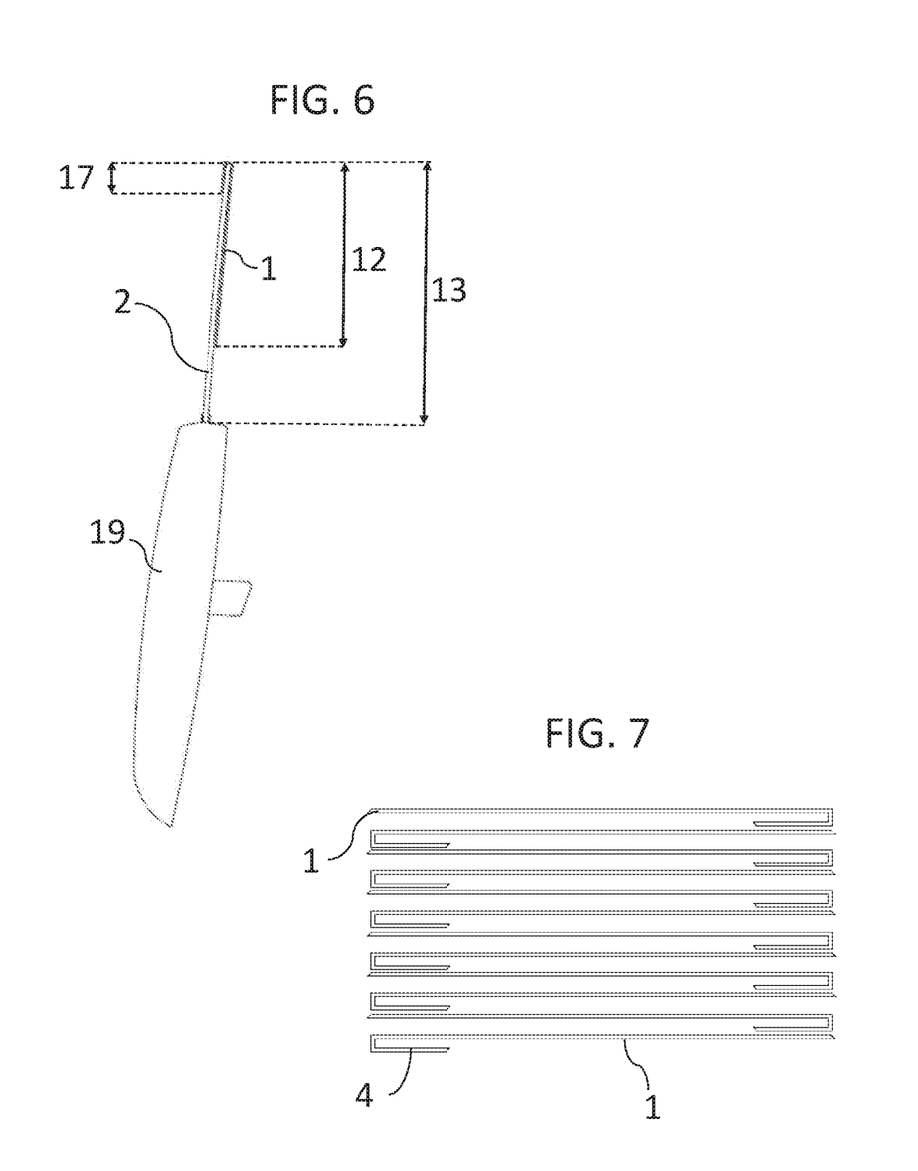
FIG. 6 is a sectional view of a car's door, the window and an embodiment of an automotive protective plate in accordance with the present invention.
FIG. 7 is an elevation view of a stack of protective plates accordance with the present invention.

With respect to FIG. 6, a sectional cut of the door 19 of a given vehicle can be seen, where the location of the plate 1 can be seen, at the upper end of a window 2, where the height-of-the-plate 12 is shorter than the max-height-of-the-window 13 by at least the length-of-the-fin 17, so that eventually, the window 2 of the vehicle can be slightly lowered or raised.

Lastly, FIG. 7 shows a stack of plates 1, which due to their thickness of 0.8 mm, can easily be stored under the seat of a vehicle.

The description as set forth is not intended to be exhaustive or to limit the invention to the precise form disclosed. Many modifications and variations are possible in light of the teachings above without departing from the spirit and scope of the forthcoming claims.

What is claimed and desired to be secured by patent is as follows:

1. An automotive protective plate for sunlight and UV radiation that can be positioned hung on any front or rear side window of a car or vehicle, by means of fins or tongues made of the same material than the protective plate and in one piece, which protrude a few millimeters from the top-side-of-the-window and have a thickness, shape and width such that said window closes perfectly, even with the protective plate attached to them, allowing for the window be partially lowered and raised with the plate attached in place without the protective plate being detached or falling.

2. The automotive protective plate for sunlight and UV radiation of claim 1, designed following the shape and angles of the top-side-of the window and left-side-of the-window of a specific make and model of vehicle.

3. The automotive protective plate for sunlight and UV radiation of claim 1, generally shaped as a quadrilateral having a left-side-of-the-plate, a right-side-of-the-plate, a top-side-of-the-plate, a bottom-side-of-the-plate, four corners, and one or more fins or tongues protruding from the top-side-of-the-plate.

4. The automotive protective plate for sunlight and UV radiation of claim 1, wherein said fins are made through a rotation of said fins at an angle of 180° to return downwards to a certain distance of shorter length, defining a width in which the thickness of the glass window fits tightly.

5. An automotive protective olate for sunlight and UV radiation that can be positioned hung on any front or rear side window of a car or vehicle, by means of fins or tongues which protrude a few millimeters from the too-side-of-the-window and have a thickness, shape and width such that said window closes perfectly, even with the protective plate attached to them, allowing for the window be partially lowered and raised with the plate attached in place without the protective olate being detached or falling, wherein said plates can be stacked and stored one above the other, under the seat of a vehicle.

6. The automotive protective plate for sunlight and UV radiation of claim 1, wherein the height-of-the-plate is at least 50% shorter than the max-height-of-the-window.

7. The automotive protective plate for sunlight and UV radiation of claim 1, wherein the main material used for the manufacturing of said plate is a polymer having a width of no more than 2 mm and treated with an UV blocker.

8. The automotive protective plate for sunlight and UV radiation of claim 3, generally shaped as a rectangle.

9. The automotive protective plate for sunlight and UV radiation of claim 3, wherein at least one of said corners is a curved corner.

10. The automotive protective plate for sunlight and UV radiation of claim 3, wherein all corners are curved corners.

11. The automotive protective plate for sunlight and UV radiation of claim 3, generally shaped as a stylized trapezoid wherein the top-side-of-the-plate and the bottom-side-of-the-plate are parallel straight lines.

12. The automotive protective plate for sunlight and UV radiation of claim 3, wherein the top-side-of-the-plate is curved.

13. The automotive protective plate for sunlight and UV radiation of claim 4, having only one fin centered around the middle of the top-side-of-the-plate.

14. The automotive protective plate for sunlight and UV radiation of claim 4, having exactly two fins.

15. The automotive protective plate for sunlight and UV radiation of claim 7, wherein said polymer is PET and said UV blocker is an UV blocker for PET.

16. The automotive protective plate for sunlight and UV radiation of claim 15, wherein said UV blocker for PET is a Blocking Additive in solid masterbatch fom1 typically used for light blocking and protection of PET bottles of liquid dairy contents.

17. The automotive protective plate for sunlight and UV radiation of claim 12, wherein the curvature of the top-side-of-the-plate is designed following the exact curvature of the top-side-of-the-window of a specific make and model of vehicle.

* * * * *